March 17, 1936.  G. LANGFORD  2,034,044
RAIL JOINT
Filed Aug. 30, 1934  2 Sheets-Sheet 2
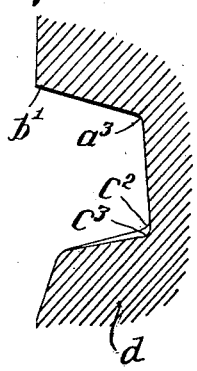
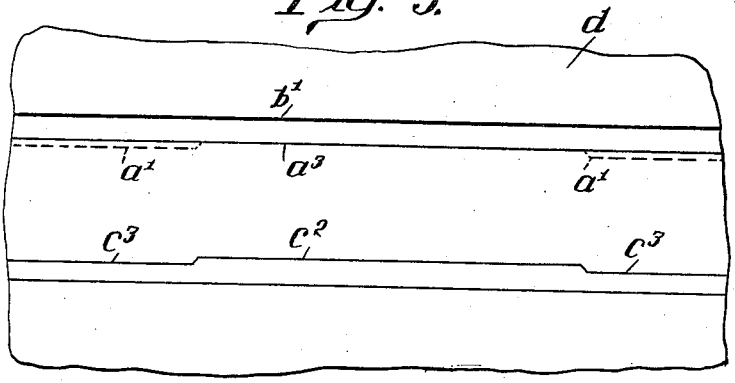
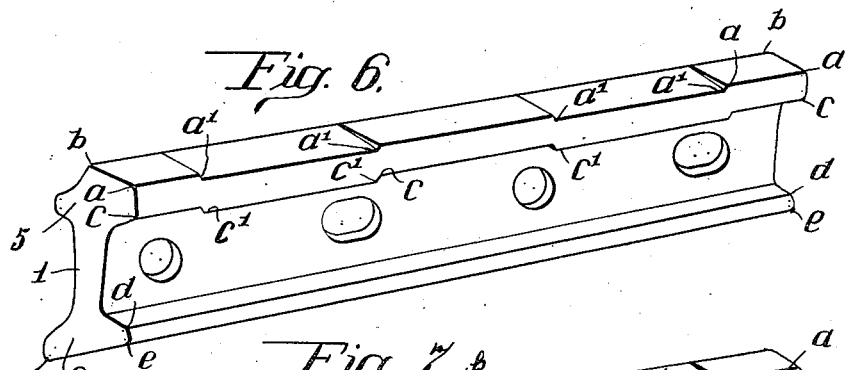
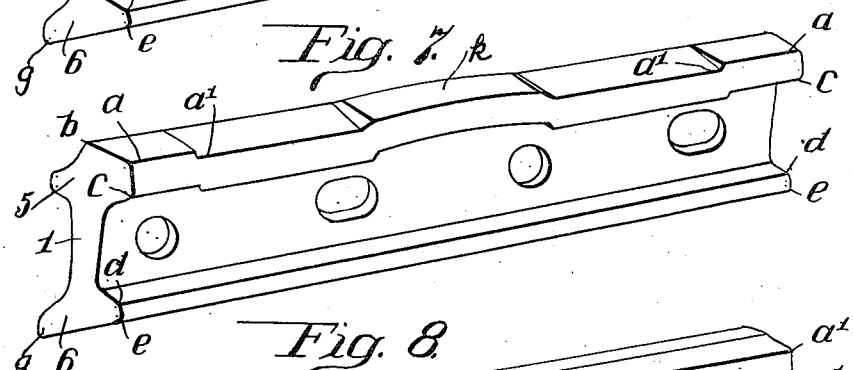
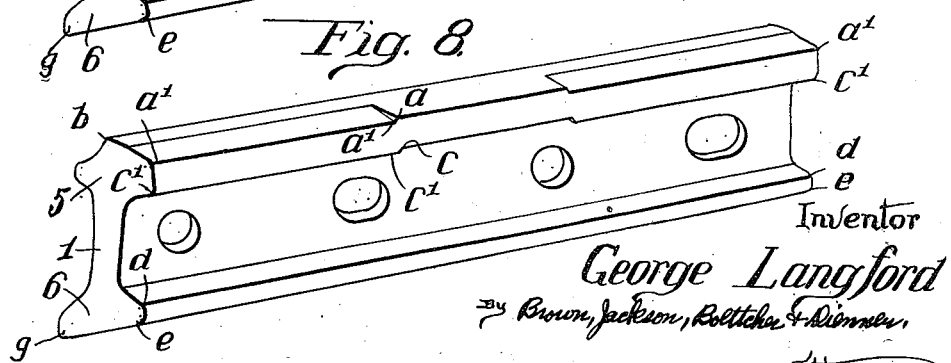
Inventor
George Langford
By Brown, Jackson, Boettcher & Dienner
Attorneys Patented Mar. 17, 1936

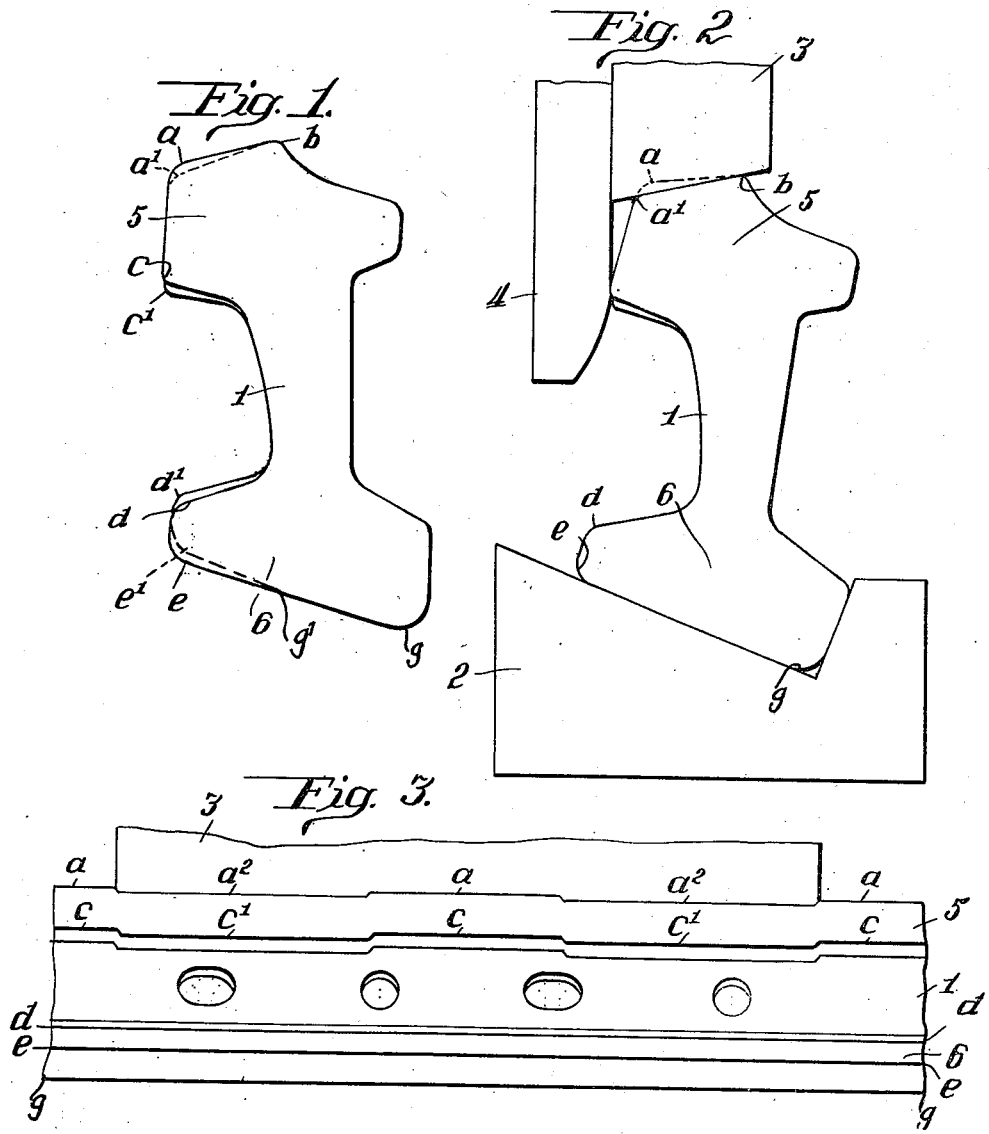

2,034,044

UNITED STATES PATENT OFFICE 2,034,044

RAIL JOINT

George Langford, Joliet, Ill., assignor to McKenna Process Company of Illinois, Joliet, Ill., a corporation of Illinois Application August 30, 1934, Serial No. 742,190

7 Claims. (Cl. 238—243)

This invention relates to rail joints, and to bars for use therein.

The increasing use of heavy laterally rigid joint bars has brought about a condition where some interruption of the ordinary continuous fishing surface is required to maintain a tight central fit of the joint after it begins to wear.

My invention has to do with rail joints used in railway tracks, and more particularly with a joint bar of laterally rigid construction wherein one or both of its top and bottom fishing surfaces is provided with depressions each side of its longitudinally central portion so as to effect rail clearance. The depressions are of novel shape and made in a novel manner, the main purpose being to provide a simple and accurate method of providing rail clearances so placed and proportioned as to insure a highly efficient form of joint bar.

The main object of my invention is to provide a laterally rigid bar having its top fishing surface so modified that a tight fishing fit may be maintained at the central portion of the joint, not only initially but after wear begins.

Another object is to maintain a central fit of the joint in service without subjecting the central portion of the bar to objectionable inbending strain by excessive center bolt tension.

Another very important object is to provide a bar with the above advantages which may be manufactured cheaply and accurately. Further objects and advantages of my invention will appear from the detail description.

In the drawings:

Figure 1 is an end view of one form of a bar embodying my invention;

Figure 2 is an end view of a bar being altered in accordance with my invention, positioned in the means for effecting the desired alteration of the bar;

Figure 3 is an inner side view of the bar being altered in accordance with Figure 2, parts being omitted for clearness of illustration;

Figure 4 is a fragmentary end view of a die for accurately shaping a bar head reformed in accordance with Figures 2 and 3;

Figure 5 is a fragmentary plan view of the die of Figure 4;

Figure 6 is an isometric inner side view of a bar embodying my invention, substantially similar to the bar of Figure 1;

Figure 7 is a view similar to Figure 6, but showing a crowned bar; and

Figure 8 is a view similar to Figure 7, showing a modified form of bar.

Although the rail joints constitute the most important part of railroad tracks, the initial cost of the rail joint bars is an important consideration with the purchasing departments of the railroads. The manufacturer of rail joint bars is thus confronted with the difficulty of producing an efficient bar at low cost, which is a serious obstacle. The present invention is therefore directed particularly to an efficient design of bar and a comparatively cheap method of making it. A most important element in manufacture is accuracy, particularly as regards the fishing surface alignment. Rail joint bars are now subjected to severe inspection and tests, and the manufacturer often has his product rejected with resulting loss. In undertaking new designs requiring, as they usually do, changes in manipulation, he assumes the risk of difficulties which may well mean the rejection of his product. Method of manufacture has become one of the most important factors in new rail joint construction.

There is a general tendency among railroad engineers to adopt a laterally rigid joint bar, one with lateral top reinforcement and hardened by oil-quenching, and bars of this general type are coming into extensive use. It is generally known that the top central six inches or so of a joint is subjected to the greatest wear, the rest of the joint at top and bottom having much less wear, there being very little, sometimes no wear at the ends of the joint. Many railroad engineers are beginning to realize that while the old soft angle bars would bend in at center under center bolt tension and thus take up central wear, the modern laterally rigid bars resist such inbending, and a joint once loose, remains loose after appreciable wear begins.

It is known to provide a laterally flexible bar having a fishing surface providing for rail contact at its center and ends with intermediate clearances between center and ends. Such a bar has been called a "flexible bar" and is particularly applicable to unhardened angle bars. The present invention is not concerned with flexibility, but with rigidity in modern rigid bars whose lateral rigidity supplemented by bolt tension at center, imparts pressure and wear at the ends, the area of rail contact being reduced at the end portions of the bar so as to accelerate wear there relative to the central portion. In this manner, the rigidity of the bar is maintained without recourse to inbending or flexibility of any kind to maintain a central fit of the joint.

In the prior art there are many "flexible bars", some having metal removed from between the center and ends of a fishing surface to provide intermediate rail clearance; others having additional metal at the center and ends resulting in clearances between; and still others wherein intermediate portions of a bar or some of its members are deflected outwardly or compressed vertically to provide rail clearance. Of the three, the latter is the most applicable to present-day bars, and yet I find that such deformations are highly impractical from a manufacturing viewpoint.

Bars made nowadays must be heated and quenched carefully to meet the requirements of hardness and tensile strength. The initial heat must be low because of high carbon content, and the forging temperature must be extremely low, otherwise the bars will be too hard after oil-quenching to withstand the rigid bend test.

The bars, at the low heat necessary, are extremely resistant to forging, and it is very difficult to deflect or compress intermediate portions of the bar so as to provide rail clearance without distorting the bar as a whole. Inasmuch as the fishing surfaces of the center portion and ends must be within a few thousandths of an inch in proper alignment with each other and with the other of the top and bottom fishing surfaces, any considerable deformation of the bar to provide intermediate fishing surface clearances is attended with grave risks, so much so that, as far as I am aware, manufacturers have hesitated to assume the burden of such risks, and railroads in general are still struggling with the idea of keeping their rigid joints tight by inbending at center, as was their custom with soft, yielding bars.

The present invention is directed to laterally rigid bars originally rolled in the ordinary manner, cut to length, heated, and then treated in a particular manner. Because of the low forging heat necessary to insure good physical tests, my design of bar is directed to insure intermediate clearness with a minimum of deformation. Instead of deflecting outwardly the top and bottom members, or of distorting the web vertically, as in the prior art, I deflect only a portion of the bar head diagonally downward so as to maintain a uniformity of fishing height throughout the length of the bar, the web and bottom members of the bar not being subjected to any deformation. The method of manufacture may be described as follows:

Figure 1 is an end view of a laterally rigid bar embodying my invention as applied to the two inner portions of the top and bottom members. The inner top portion of the bar, which originally occupies the position shown at $b$—$a$—$c$ at the center and ends of the bar, has been deflected downward to the position $b$—$a^1$—$c^1$ at the intermediate portions, complete or partial intermediate clearance being represented by $a$—$b$—$a^1$. This bar comprises a web 1, a head 5 projecting inward beyond the inner side of the web, and a foot 6 also projecting inward beyond the inner side of the web. To deflect the inner portion of the head downward, the bar, as rolled, is subjected to a bull-dozing operation as in Figure 2 which is an end view of the bar in a fixed holder 2, with a movable top die 3 closed upon the bar so as to make a sloping indentation $a$—$b$—$a^1$ in the bar head 5. Preferably the bar is inclined so as to receive the pressure through its least resistant vertical axis, and an outer guide member 4 may be used to maintain the bar rigid when bull-dozed. I find, that at the low heat employed, the bar head yields readily downward at its inner part as shown, there being no lateral deformation of the bar or buckling of the web. Although the intermediate surfaces of the bar are shown with no fishing width at $b$, they may be made to have appreciable although reduced width. The inner overhanging portion of the bar head 5 yields so readily to the pressure that the width of intermediate fishing surface at $b$ can be made very accurately, as can the depth of clearance. It will be seen that intermediate surface $a^1$—$b$ is inclined more than the end and center surfaces $a$—$b$, $a^1$—$b$ being so inclined in order to reduce the pressure where there is the greatest resistance to the bull-dozing pressure. The holding means shown is intended to be merely illustrative and may be varied considerably. In the case of a newly rolled bar means may be provided for holding the bar in such a manner that no misalignment of its fishing surfaces will result from the bull-dozing operation, the form of the bar and the method of producing it being directed to final accuracy, which results very largely from the very slight amount of metal displaced, and the manner of displacing it.

Figure 3 is an inner side view of the bar and the forming means of Figure 2, the guide 4 and the bottom holder 2 not being shown. The movable bull-dozer or die 3 has, at its bottom, raised surfaces $a^2$ which indent the intermediate top surface of the bar, leaving the end and center surfaces $a$ as they were originally. The inner portion of the bar head bends slightly downward as can be seen in this figure.

The resultant bar may be as in Figure 1 with any one of its two inwardly extended portions deflected as shown. Obviously these deformations are on the lines of least resistance, and danger of distorting the bar as a whole is thereby avoided. Preferably I deflect only the inner portion of the top member so as to further restrict resultant distortion; and inasmuch as I provide intermittent clearances not for flexibility but for rigidity and a top central fishing fit, the bottom portion of the bar is left as it was originally.

I may also employ the method of Figures 2 and 3 as a step preliminary to a second operation performed by the die illustrated in Figures 4 and 5. Referring to these figures, die $d$ has a groove $b^1$—$a^3$—$c^2$ to receive the inner portion of the bar head. The bar, as it comes from the bull-dozer has intermediate depressions $a^1$ pressed in, as shown in Figure 3. In the second operation of Figures 4 and 5 the depressions in the bar itself are shown in Figure 5 as dotted lines $a^1$. It is important to note here that the die-wall $a^3$—$b^1$ corresponding to the top fishing surface of the bar, is smooth from end to end, and the intermediate bar surfaces $a^1$ are relieved from the reforming pressure by providing recesses $c^3$ in the opposite die wall, whereby there is no pressure to press out recesses $a^1$ in the bar after being put in by the preliminary operation. It will be understood that the die of Figures 4 and 5 is used in conjunction with an upper complementary die suitably shaped to receive the outer portion of the head of the bar.

Figure 6 is an inside view of a rigid bar modified by the method of Figures 2 and 3. To all intents and purposes, the bar is straight, therefore easily inspected for accuracy of line vertically and horizontally. The web and bottom member have no deformations. The distortion of the top member is slight and made on the line of least resistance whereby no misalignment results. Such a bar can be made cheaply and without knocking it out of shape.

Figure 7 is a bar similar to the bar of Figure 6, except that its top center portion is crowned at K, the form of bar being particularly suitable for use on worn rails.

The outer upper corner of the head of the bar may be a continued straight line b—b. There may be complete obliteration of rail contact there, or there may be appreciable width, narrower however than at the central portion of the bar. Preferably, there is no depression on the line b—b, so as to seal the outer top part of the bar, when applied to the rail, to ingress of dirt and rust. The length of the top central fishing surface is made in accordance with the length of ordinary greatest wear. The depth of the inner portion of the bar head is no less at the intermediate portions than at the central portion, and may be greater. The partial depression of an end fishing surface may extend to the extreme ends as in Figure 8. It may also be frequent, with complete or partial clearance between center and ends. The novelty of my invention lies in the inclined intermediate surfaces which are more inclined than are the central and end contact surfaces. As has been explained, the advantage of this inclination of portions of a fishing surface, is to provide clearance in a manner quite practical from the manufacturer's viewpoint of a product to be made cheaply and accurately. The invention lends itself readily to great diversity of form. The bar may be longitudinally curved, or crowned at center to fit worn rails, as shown at k in Figure 8. Crowning is preferably applied to the top fishing surface and at the central portion only. As illustrated in Figure 1 either of the two inwardly extended portions of the bar may be deflected vertically so as to provide partial or complete rail clearance of a fishing surface to each side of its longitudinally central portion. Referring to Figure 1, the intermediate portions of the bottom of the bar may be deflected upward from the original position thereof, corresponding to d—e—g at the end of the bar, into the position d¹—e¹—g¹, to provide the intermediate clearances d¹—e¹—g¹.

I have shown, by way of example, merely a few forms of bars embodying my invention, and I do not wish to be limited to them, for it is obvious that my invention may be applied in numerous ways and on practically all types of bars. As described and illustrated in the drawings, rail fishing clearance on a fishing surface is gained not by direct vertical or lateral deflection but by a rotation of the inner part of a bar member. For a better understanding and wording of the claims, I define this rotary deflection of a bar member as a tilting of the bar member, this being more clearly shown in Fig. 2 which is the preferred method of manufacture. Only a top or bottom member is tilted, there being no necessity for tilting or distorting the web member to secure the desired rail surface clearances, nor for deflecting any part of the bar outwardly.

What I claim is:

1. In a rail joint including the rail ends, a bar in top and bottom rail fishing contact for substantial lengths of its center portion and end portions, the top and bottom members of the bar having inwardly and outwardly extended parts, and being of substantially uniform section throughout their lengths, said inwardly extended part of at least one of said top and bottom members being depressed out of rail fishing contact between said center portion and end portions, there being substantially no vertical nor horizontal deformation of the web member nor of the outer parts of the top and bottom members of the bar between said center portion and end portions.

2. In a rail joint, a bar as in claim 1, said bar having the length of its top central rail contacting surface conforming substantially to the length of greatest wear of the rail ends.

3. In a rail joint, a bar as claim 1, said bar having its top and bottom members in rail fishing contact throughout the length of the bar with only partial intermediate rail clearance on the inner side of at least one of said top and bottom members.

4. In a rail joint including the rail ends, a bar as in claim 1, said bar having complete intermediate rail clearances at both its top and bottom.

5. In a rail joint including the rail ends, a bar in top and bottom rail fishing contact for substantial lengths of its center portion and end portions, the top and bottom members of the bar having inwardly and outwardly extended parts and being of substantially uniform section throughout their lengths, said inwardly extended part of said top member being depressed between its center portion and end portions and being only partially out of rail fishing contact between said center portion and end portions, there being substantially no vertical nor horizontal deformation of the web member nor of the outer parts of the top and bottom members of the bar between said center portion and end portions.

6. In a rail joint including the rail ends, a bar as in claim 1, said bar having complete intermediate rail clearances at its top only.

7. In a rail joint including the rail ends, a bar in top and bottom rail fishing contact for substantial lengths of its center portion and end portions, the top and bottom members of the bar having each an inwardly extended part of substantially uniform section throughout its length, one at least of said inwardly extended parts being depressed out of rail fishing contact between said center portion and end portions, there being substantially no vertical nor horizontal deformation of the web member nor of the outer parts of the top and bottom members of the bar between said center portion and end portions.

GEORGE LANGFORD.